United States Patent
Lu

(10) Patent No.: US 9,452,097 B2
(45) Date of Patent: Sep. 27, 2016

(54) ELECTRIC MOBILITY VEHICLE

(71) Applicant: Clive Lu, Hicksville, NY (US)

(72) Inventor: Clive Lu, Hicksville, NY (US)

(*) Notice: Subject to any disclaimer, the term of this patent is extended or adjusted under 35 U.S.C. 154(b) by 150 days.

(21) Appl. No.: 14/230,817

(22) Filed: Mar. 31, 2014

(65) Prior Publication Data

US 2015/0272793 A1     Oct. 1, 2015

(51) Int. Cl.
*A61G 5/06* (2006.01)
*B62K 5/007* (2013.01)
*B62K 5/023* (2013.01)

(52) U.S. Cl.
CPC ............... *A61G 5/061* (2013.01); *A61G 5/065* (2013.01); *B62K 5/007* (2013.01); *B62K 5/023* (2013.01); *A61G 2203/30* (2013.01); *B62K 2202/00* (2013.01)

(58) Field of Classification Search
CPC .. A61G 5/061; A61G 5/065; A61G 2203/30; B62K 5/023; B62K 5/007; B62K 2202/00
See application file for complete search history.

(56) References Cited

U.S. PATENT DOCUMENTS

| | | | | |
|---|---|---|---|---|
| 2,742,973 A * | 4/1956 | Johannesen | ............ | A61G 5/061 180/19.1 |
| 2,765,860 A * | 10/1956 | Church | ............ | A61G 5/061 180/6.4 |
| 2,931,449 A * | 4/1960 | King | ............ | A61G 5/061 180/8.2 |
| 3,241,848 A * | 3/1966 | Flory | ............ | A61G 5/061 280/11 |
| 3,283,839 A * | 11/1966 | Brown | ............ | A61G 5/061 180/8.2 |
| 3,372,766 A | 3/1968 | Lifferth | | |
| 3,450,219 A | 6/1969 | Fleming | | |
| 3,580,344 A | 5/1971 | Floyd | | |
| 4,077,483 A * | 3/1978 | Randolph | ............ | A61G 5/04 180/6.5 |
| 4,645,222 A * | 2/1987 | Hester | ............ | A61G 5/065 180/8.2 |
| 4,790,548 A * | 12/1988 | Decelles | ............ | A61G 5/061 180/6.5 |
| 4,794,999 A * | 1/1989 | Hester | ............ | A61G 5/061 180/8.2 |
| 4,892,323 A * | 1/1990 | Oxford | ............ | A61G 5/023 105/129 |
| 5,111,899 A | 5/1992 | Reimann | | |
| 5,395,129 A | 3/1995 | Kao | | |
| 5,971,091 A | 10/1999 | Kamen et al. | | |
| 6,325,167 B1 | 12/2001 | Jiang | | |
| 6,435,538 B2 * | 8/2002 | Ellis | ............ | 280/5.26 |
| 6,644,675 B2 * | 11/2003 | Ellis | ............ | A61G 5/061 280/250.1 |

(Continued)

*Primary Examiner* — Kevin Hurley
*Assistant Examiner* — Gabriela C Craciun
(74) *Attorney, Agent, or Firm* — Welsh Flaxman & Gitler LLC

(57) ABSTRACT

An electric powered mobility vehicle includes a main support having an upper surface and a lower surface, wherein the main support also includes a front end and a rear end. The mobility vehicle also includes a seat assembly secured to the upper surface of the main support adjacent the rear end and a steering assembly extends upwardly from the upper surface of the main support along the front end thereof. A control assembly and a power drive transmission assembly are linked to a plurality of rotating forked assembly units secured to the main support for creating the forces necessary to move and maneuver the present mobility vehicle. Each of the plurality of rotating forked assembly units includes a plurality of fork arms extending outwardly from a central hub and wheels coupled to free ends of the plurality of fork arms.

16 Claims, 8 Drawing Sheets

(56) References Cited

U.S. PATENT DOCUMENTS

| | | | |
|---|---|---|---|
| 6,662,889 B2 | 12/2003 | De Fazio et al. | |
| 6,742,787 B1* | 6/2004 | Wheeler | B62D 61/10 |
| | | | 280/160 |
| 7,128,175 B1 | 10/2006 | Martineau | |
| 7,275,607 B2* | 10/2007 | Kamen | A63C 17/01 |
| | | | 180/7.1 |
| 8,061,460 B2* | 11/2011 | Scheck | A61G 5/063 |
| | | | 180/8.1 |
| 8,393,420 B2* | 3/2013 | Kim | B62B 5/026 |
| | | | 180/8.2 |
| 8,490,723 B2* | 7/2013 | Heinzmann | B62J 17/08 |
| | | | 180/218 |
| 8,789,628 B2* | 7/2014 | Swenson | A61G 5/066 |
| | | | 180/6.5 |
| 2006/0260852 A1* | 11/2006 | Wu | B62K 5/007 |
| | | | 180/65.1 |
| 2008/0023932 A1* | 1/2008 | Baumbach | A61G 5/023 |
| | | | 280/250.1 |
| 2013/0184917 A1* | 7/2013 | Sarokhan | B62B 5/0036 |
| | | | 701/22 |
| 2013/0192907 A1 | 8/2013 | Sarokham et al. | |

\* cited by examiner

ELECTRIC MOBILITY VEHICLE

BACKGROUND OF THE INVENTION

1. Field of the Invention

The present application is directed to electric mobility vehicles.

2. Description of the Related Art

Electric scooters, mobility devices as they are commonly called, have become an invaluable tool for those experiencing temporary or permanent limitations in their ability to move about in a conventional manner. However, these scooters are sometimes limited in their ability to traverse unconventional surfaces.

While many attempts have been made to overcome the inability of the mobility devices to effectively traverse uneven terrain, there remains a need for an electric mobility vehicle offering improvements in the ability to traverse uneven terrain.

SUMMARY OF THE INVENTION

It is, therefore, an object of the present invention to provide an electric powered mobility vehicle including a main support having an upper surface and a lower surface, wherein the main support also includes a front end and a rear end. The mobility vehicle also includes a seat assembly secured to the upper surface of the main support adjacent the rear end and a steering assembly extends upwardly from the upper surface of the main support along the front end thereof. A control assembly and a power drive transmission assembly are linked to a plurality of rotating forked assembly units secured to the main support for creating the forces necessary to move and maneuver the present mobility vehicle. Each of the plurality of rotating forked assembly units includes a plurality of fork arms extending outwardly from a central hub and wheels coupled to free ends of the plurality of fork arms.

It is also an object of the present invention to provide a mobility device wherein the rear end of the main support is substantially flat and the front end of the main support is curved upwardly.

It is another object of the present invention to provide a mobility device wherein the plurality of rotating forked assembly units includes first and second front rotating forked assembly units secured to the main support at a position adjacent the front end of the main support and first and second rear rotating forked assembly units secured to the main support at a position adjacent the rear end of the main support.

It is a further object of the present invention to provide a mobility device wherein the power drive transmission assembly includes a front power drive transmitting unit controlling rotation of the first and second front rotating forked assembly units and a rear power drive transmitting unit controlling rotation of the first and second rear rotating forked assembly units.

It is also an object of the present invention to provide a mobility device wherein each of the front power drive transmitting unit and the rear power drive transmitting unit includes concentric inner and outer drive shafts selectively controlling rotation of the wheels and the forked assembly units.

It is another object of the present invention to provide a mobility device wherein transmission of power to the inner drive shaft causes rotation of the wheels and transmission of power to the outer drive shaft causes rotation of the rotating forked assembly units.

It is a further object of the present invention to provide a mobility device wherein the outer drive shaft is fixedly coupled to the rotating forked assembly units.

It is also an object of the present invention to provide a mobility device wherein the rear power drive transmitting unit includes first and second electric motors and the rear power drive transmitting unit includes first and second electric motors.

It is another object of the present invention to provide a mobility device wherein each of the plurality of rotating forked assembly units includes three fork arms extending outwardly from a central hub.

It is a further object of the present invention to provide a mobility device wherein the three forks arms are symmetrically positioned and respectively define 120 degree angles between adjacent fork arms.

It is also an object of the present invention to provide a mobility device wherein the control assembly includes a microprocessor receiving sensor signals.

It is another object of the present invention to provide a mobility device wherein the sensor signals are received from a radar detection device, a vibration detection device and a level detection device.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

Figure 1:
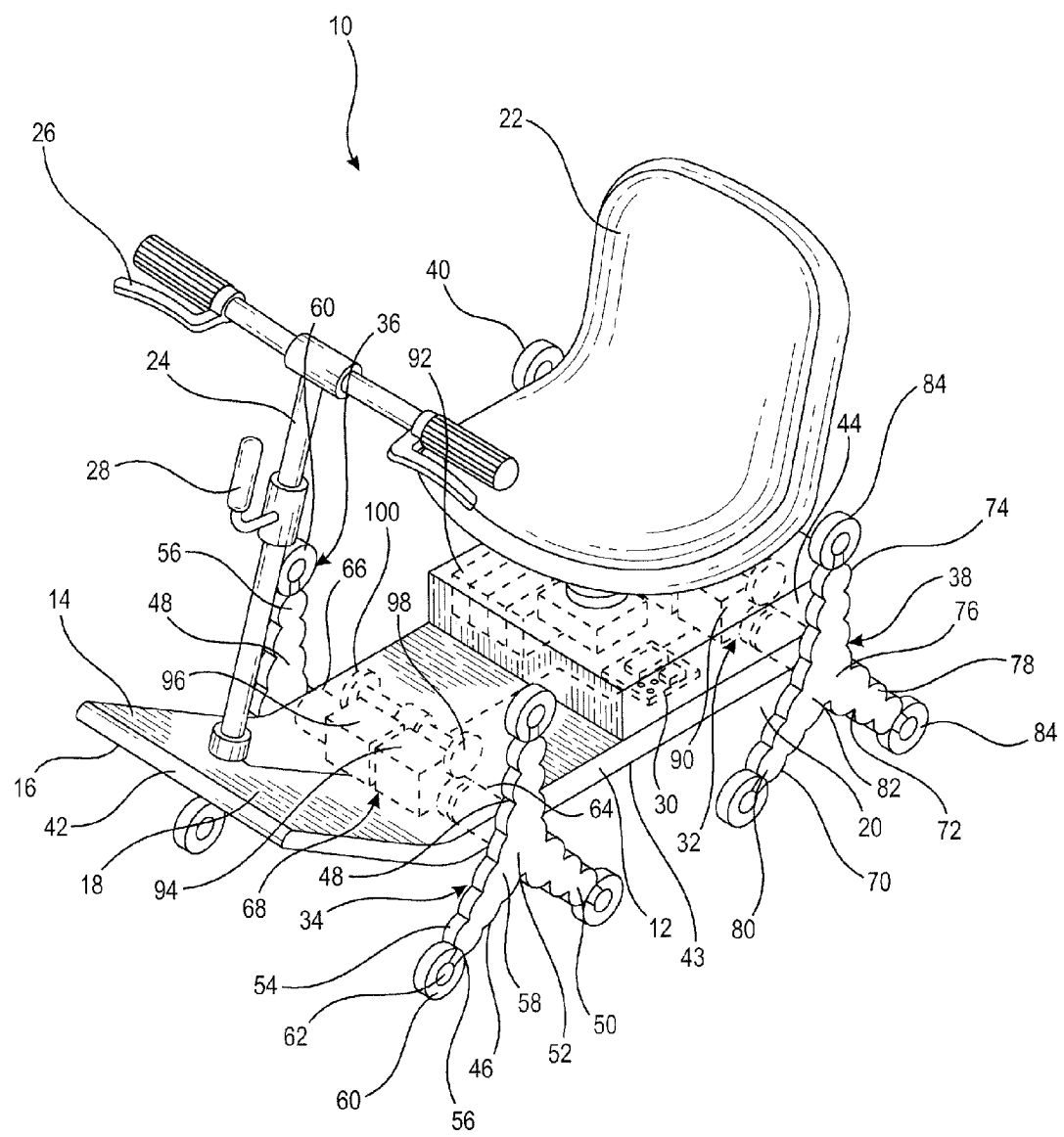
FIG. 1 is a perspective view of a mobility vehicle in accordance with the present invention.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

With reference to the various figures an electric powered mobility vehicle 10 is disclosed. The mobility vehicle 10 includes a main support 12 having an upper surface 14 and a lower surface 16. The main support 12 also includes a front or first end 18 and a rear or second end 20.

The rear end 20 of the main support 12 is substantially flat. Supported upon the upper surface 14 of the main support 12 adjacent the rear end 20 thereof are various power and control systems that will be discussed below in greater detail. In addition, the upper surface 14 of the main support 12 adjacent the rear end 20 supports a seat assembly 22. The seat assembly 22 is a conventional seat assembly 22 used in conjunction with mobility vehicles and a variety of structures may be employed without departing from the spirit of the present invention. It is appreciated a gyroscopic based tilting system may be used in conjunction with the seat assembly to maintain the seat assembly in a horizontal, level orientation. Such a system is disclosed in U.S. Pat. No. 8,490,723, and assigned to Segway, Inc., the relevant disclosure of which is incorporated herein by reference.

The front end 18 of the main support 12 is curved upwardly. As will be appreciated based upon the following disclosure, the upward curvature of the front end 18 of the main support 12 allows for enhanced maneuverability. A steering assembly 24 extends upwardly from the upper surface 14 of the main support 12 along the front end 18 thereof. The steering assembly 24 is conventional in design and includes both the ability to rotate for sending turning signals to the control assembly of the mobility vehicle 10 in a manner discussed below in greater detail. The steering assembly 24 also includes speed control actuators 26 used in a conventional manner to control the speed and breaking of the mobility vehicle 10. The steering assembly 24 also includes a height adjustment mechanism 28 allowing for adjustment in the height of the steering assembly 24 in a manner accommodating users of the various sizes. It is appreciated the steering assembly may be either used in conjunction with the controls for the wheels and rotating forked assembly units as discussed below in greater detail or the steering assembly may be employed as a conventional steering assembly.

As will be described below in greater detail, the mobility vehicle 10 also includes a control assembly 30 and a power drive transmission assembly 32. The control assembly 30 and a power drive transmission assembly 32 are linked to rotating forked assembly units 34, 36, 38, 40 used in creating the forces necessary to move and maneuver the present mobility vehicle 10.

In accordance with a preferred embodiment, the mobility vehicle 10 includes first and second front rotating forked assembly units 34, 36 and first and second rear rotating forked assembly units 38, 40. The first and second front rotating forked assembly units 34, 36 are secured to the main support 12 at a position adjacent the front end 18 of the main support 12 where the main support 12 begins to curve. The first and second rear rotating forked assembly units 38, 40 are secured to the main support 12 at a position adjacent the rear end 20 of the main support 12 where the main support 12 begins to curve. The forked assembly units are ultimately positioned so as to optimize the maneuverability of the mobility as it encounters obstacles. In accordance with a preferred embodiment, and with the stability of the mobility vehicle 10 in mind, the first and second front rotating forked assembly units 34, 36 are positioned between the front edge 42 of the main support 12 and the longitudinal center 43 of the main support 12. In contrast, the first and second rear rotating forked assembly units 38, 40 are positioned near the rear edge 44 of the main support 12 at the rear end 20 thereof.

The first and second front rotating forked assembly units 34, 36 are the same and only the first front rotating forked assembly unit 34 will be described below in detail although it is appreciate the second front rotating forked assembly unit 36 includes the same elements. The first front rotating forked assembly unit 34 includes three fork arms 46, 48, 50 extending outwardly from a central hub 52. The three forks arms 46, 48, 50 are symmetrically positioned and respectively define 120 degree angles between adjacent fork arms 46, 48, 50.

Each of the three fork arms 46, 48, 50 includes sequential outwardly facing bumps 54 along the length thereof. As will be appreciated based upon the following disclosure, the bumps 54 assist in maneuverability by creating gripping surfaces for use as the first front rotating forked assembly unit 34 is rotated; that is, the bumps 54 increase the frictional interaction with obstacles when the fork arm 46, 48, 50 touches the edge of obstacles so that the fork arm may move around, over or about an obstacle into which it comes in contact. In addition, maneuverability is enhanced by tapering the three fork arms 46, 48, 50 to narrow as they extend from the central hub 52 to the free end 56 thereof.

As briefly referenced above, each of the three fork arms 46, 48, 50 includes a first end 58 and a second end 56. The first ends 58 of the respective three fork arms 46, 48, 50 are connected at the central hub 52. The second ends 56 extend outwardly from the central hub 52. Each of the second ends 56 of the three fork arms 46, 48, 50 is provided with a wheel 60 at the tip 62 thereof. That is, in accordance with a preferred embodiment, the axis about which the wheels 60 rotate is perpendicular to, and intersects with, the longitudinal axis of the respective fork arms 46, 48, 50.

The first and second front rotating forked assembly units 34, 36 are positioned on opposite sides of the main support 12. The first and second front rotating forked assembly units 34, 36 are respectively secured to the main support 12 by first and second front drive shafts 64, 66, housed within a bearing structure 67. As will be discussed below in greater detail the first and second front drive shafts 64, 66 include concentric inner and outer drive shafts and are connected to a front power drive transmitting unit 68 for controlled rotation thereof. With the exception of the fact that both the first and second front drive shafts 64, 66 are connected to the front power drive transmitting unit 68, the first and second front drive shafts 64, 66 are separate and may be rotated separately under the control of the front power drive transmitting unit 68. The first and second front drive shafts 64, 66 are coupled to the lower surface 16 of the main support 12.

The first and second rear rotating forked assembly units 38, 40 are similar to the first and second front rotating forked assembly units 34, 36. As such, the first and second rear rotating forked assembly units 38, 40 are the same and only the first rear rotating forked assembly unit 38 will be described below in detail although it is appreciate the second rear rotating forked assembly unit 40 includes the same elements. The first rear rotating forked assembly unit 38 includes three fork arms 70, 72, 74 extending outwardly from a central hub 76. The three forks arms 70, 72, 74 are symmetrically positioned and respectively define 120 degree angles between adjacent fork arms 70, 72, 74.

Each of the three fork arms 70, 72, 74 includes sequential outwardly facing bumps 78 along the length thereof. As will be appreciated based upon the following disclosure, the bumps 78 assist in maneuverability by creating gripping surfaces for use as the first rear rotating forked assembly unit 38 is rotated. In addition, maneuverability is enhanced by tapering the three fork arms 70, 72, 74 to narrow as they extend from the central hub 76 to the free end 80 thereof.

As briefly referenced above, each of the three fork arms 70, 72, 74 includes a first end 82 and a second end 80. The first ends 82 of the respective three fork arms 70, 72, 74 are connected at the central hub 76. The second ends 80 extend outwardly from the central hub 76. Each of the second ends 80 of the three fork arms 70, 72, 74 is provided with a wheel 84. It is further contemplated the fork arms might be constructed with the ability to allow for telescopic extension thereby enhancing the versatility of the present mobility vehicle.

The first and second rear rotating forked assembly units 38, 40 are positioned at opposite sides of the main support 12. The first and second rear rotating forked assembly units 38, 40 are respectively secured to the main support 12 by first and second rear drive shafts 86, 88, housed within a bearing structure 67.

As will be discussed below in greater detail the first and second rear drive shafts 86, 88 include concentric inner and outer drive shafts and are connected to a rear power drive transmitting unit 90 for controlled rotation thereof. With the exception of the fact that both the first and second rear drive shafts 86, 88 are connected to the rear power drive transmitting unit 90, the first and second rear drive shafts 86, 88 are separate and may be rotated separately under the control of the rear power drive transmitting unit 90. The first and second rear drive shafts 86, 88 are coupled to the lower surface 16 of the main support 12.

As briefly discussed above, the mobility vehicle 10 includes power drive transmission assembly 32 that transmits power to the first and second front rotating forked assembly units 34, 36 and the first and second rear rotating forked assembly units 38, 40 in a controlled manner. With this in mind, the power drive transmission assembly 32 includes a battery assembly 92 coupled to the front power drive transmitting unit 68 and the rear power drive transmitting unit 90.

Figure 5:
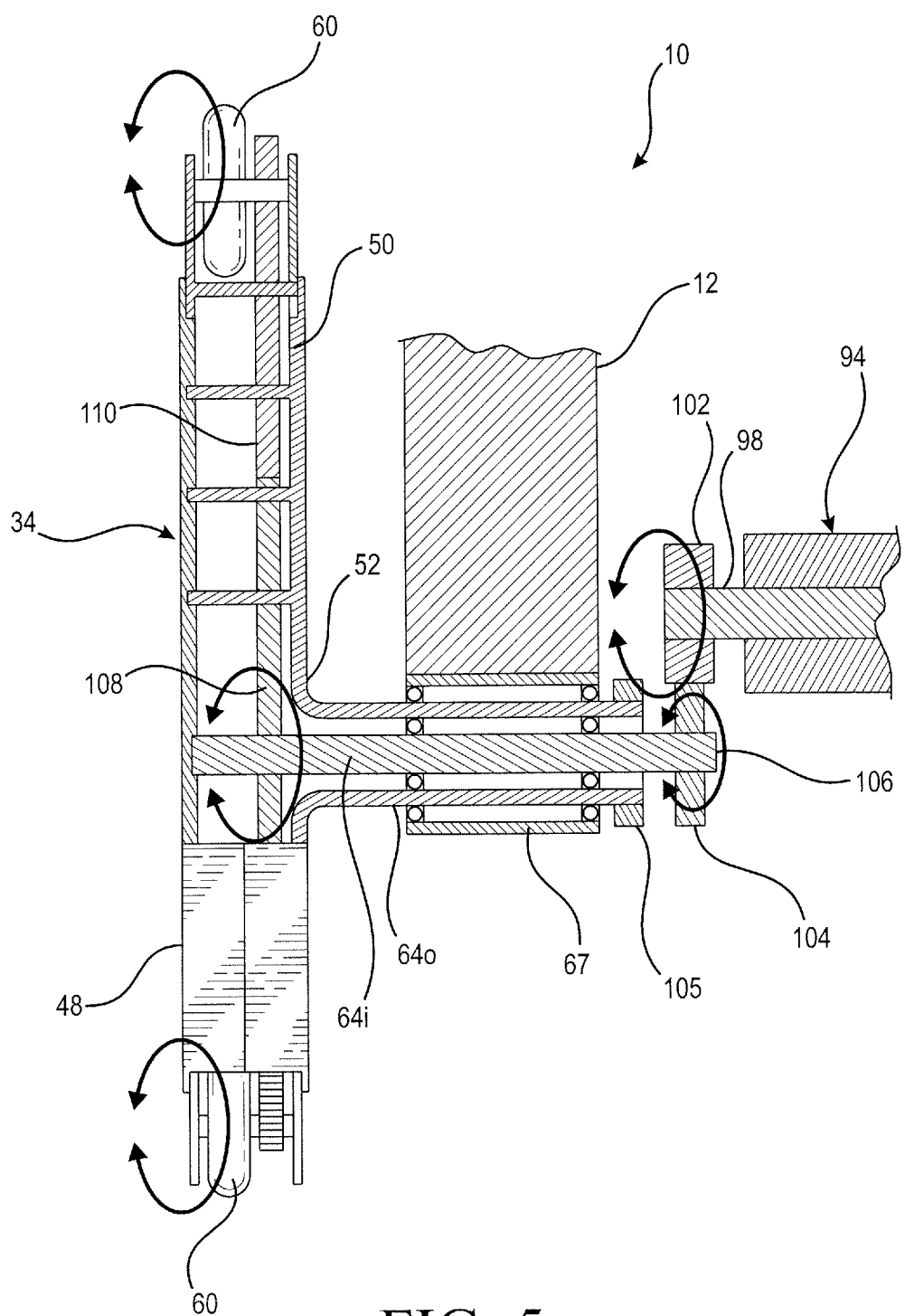
FIGS. 5 and 7 respectively show the drive system in its orientation allowing a user moving upon a flat surface (with the simple rotation of the wheels) and its orientation allowing user to climb (with the rotation of the larger diameter forked assembly units.

As briefly discussed above, the front power drive transmitting unit 68 is mechanically coupled to both the first and second front rotating forked assembly units 34, 36. The front power drive transmitting unit 68 includes first and second electric motors 94, 96, each including an output 98, 100. While individual electric motors are disclosed herein for each of the rotating forked assembly units, it is appreciated a single motor might be used where functionality allows for such a construction. The front drive shaft 64 includes concentric inner and outer drive shafts 64$i$, 64$o$ so as to selectively allow for the application of power to either the wheels 60 or the entire first front rotating forked assembly unit 34. With this in mind, the first output 98 includes a transmitting gear 102 which may be selectively mechanically coupled to a drive gear 104 at the free end 106 of the inner drive shaft 64$i$ of first front drive shaft 64 (see FIG. 5). In this way rotational motion at the first output 98 is transmitted to the inner drive shaft 64$i$ of the first front drive shaft 64 for rotation of the wheels 60 of first front rotating forked assembly unit 34. Since the inner drive shaft 64$i$ of the first front drive shaft 64 is coupled to a drive gear 108 that is coupled to the wheels 60 secured at the second ends 56 of the fork arms 46, 48, 50 motion may be transmitted from the first electric motor to the wheels 60 for rotation thereof. In accordance with a preferred embodiment, the drive gear 108 is a belt drive coupled to an idle gear 110 directly imparting rotational movement to the wheels 60. It is appreciated the belt drive 108 is of a serpentine construction and as such acts upon all of the fork arms 46, 48, 50 of the forked assembly unit 134 at the same time to rotation of all wheels 60. While a belt drive is disclosed above in accordance with a preferred embodiment of the invention, it is appreciated a variety of drive/gear systems may be used without departing from the spirit of the present invention.

Figure 7:
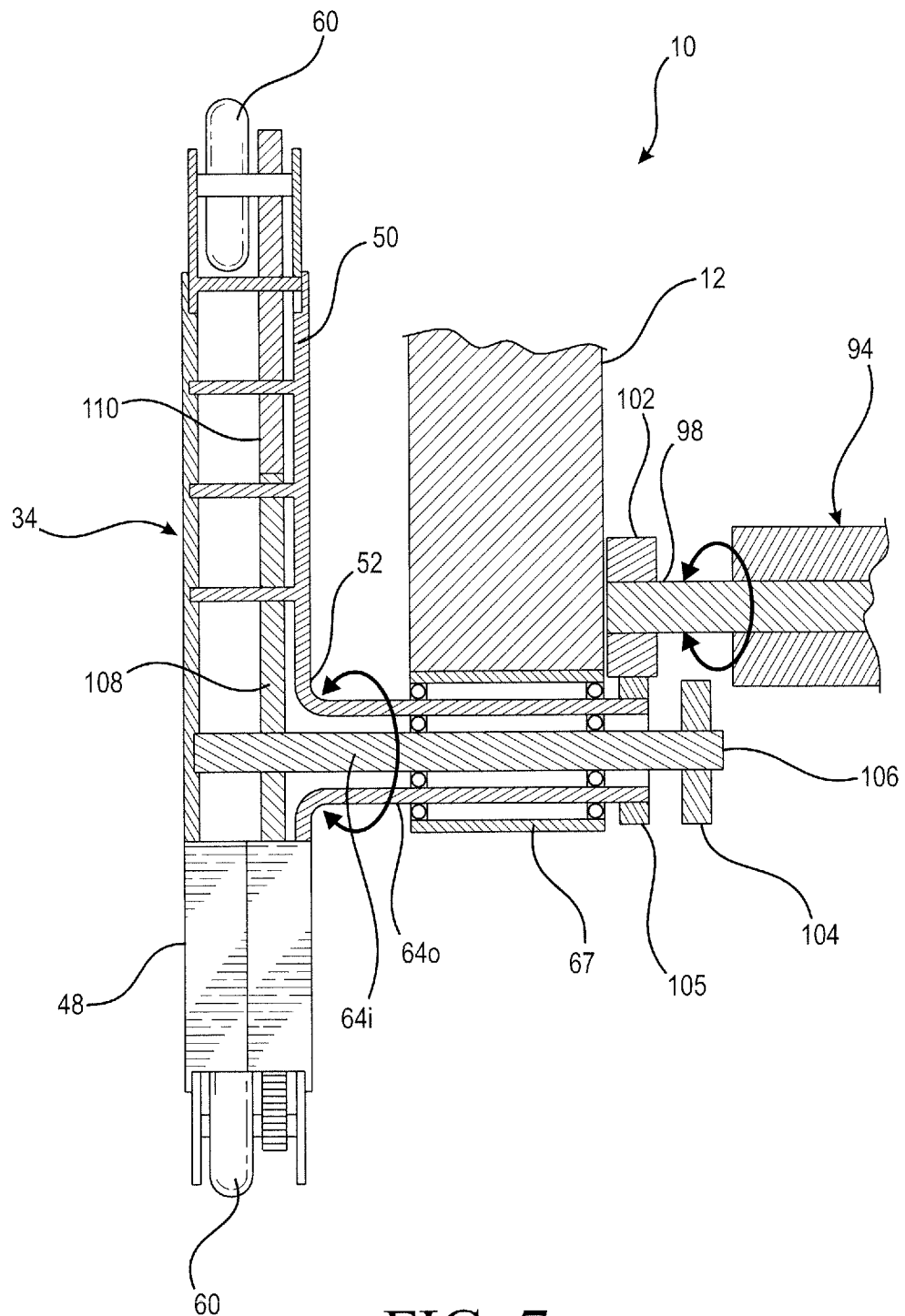

However, and as briefly discussed above, the first front drive shaft 64 also includes an outer drive shaft 64$o$, which rotates separately from the inner drive shaft 64$i$, and which is fixedly coupled to the central hub 52 of the first front rotating forked assembly unit 34 for rotation thereof. As such, when the transmitting gear 102 is moved to engage a drive gear 105 on the free end 107 of the outer drive shaft 64$o$ of the first front drive shaft 64, rotation of the wheels 60 ceases and the first front drive shaft 64 causes rotation of the first front rotating forked assembly unit 34 about the first front drive shaft 64 (see FIG. 7). The transmitting gear 102 is moved between engagement with the drive gear 104 and the drive gear 105 in a conventional manner similar to that employed in an automatic transmission of an automobile. Such systems for gear shifting and control are known to those skilled in the art and may be used in accordance with a preferred embodiment. Similarly, power is controlled and transmitted the second front drive shaft 66 in the same manners.

As with the front power drive transmitting unit 68, the rear power drive transmitting unit 90 is mechanically coupled to both the first and second rear rotating forked assembly units 38, 40. The rear power drive transmitting unit 90 includes first and second electric motors 122, 124, each including an output 126, 128. While individual electric motors are disclosed herein for each of the rotating forked assembly units, it is appreciated a single motor might be used where functionality allows for such a construction. The control and transmission of power by the outputs 126, 128 is the same as that described above with regard to the first front rotating forked assembly unit 34.

As briefly discussed above, the transmission of power to rotating forked assembly units 34, 36, 38, 40 and the wheels 60, 84 mounted thereon is controlled by a control assembly 30. The control assembly 30 employs various feedback mechanisms to achieve a high degree of maneuverability.

The control assembly 30 includes a microprocessor 146 receiving sensor signals from a radar detection device 148, a vibration detection device 150 and a level detection device 152. It is appreciated a variety such detection devices are available over the counter and may be employed as seen fit in accordance with the goals of the present invention. The information gathered from these detection devices 148, 150, 152 is processed by the microprocessor 146 which then transmits control signals to an integrated circuit control circuit 154 which ultimately sends the control signals to the front and rear power drive transmitting units 68, 90 for operation of the rotating forked assembly units 34, 36, 38, 40 and the wheels 60, 84 attached thereto. This information is used to control the rate of rotation, synchronization, etc. of the rotating forked assembly units 34, 36, 38, 40 and the wheels 60, 84 attached thereto.

In practice, the mobility vehicle 10 in a highly controlled manner by synching the motion of the rotating forked assembly units 34, 36, 38, 40 and the wheels 60, 84 to traverse various types of terrain and avoid obstacles. The radar detection device 148 functions to determine and identify the distance to obstacles (steps, humans, walls, etc.). When the distance to an obstacle is less than 24", the microprocessor initiates a warning sound, and as the distance comes close to 1-2" the radar detection device 148, in conjunction with the microprocessor 146 and the integrated circuit control circuit 154, will command the front and rear power drive transmitting units 68, 90 to cease movement of the wheels 60, 84. When the wheel 60, 84 movement stops, the rotation of the rotating forked assembly units 34, 36, 38, 40 is started by engage the idle gears 110 so as to disengage the drive gears 108.

Figure 6:
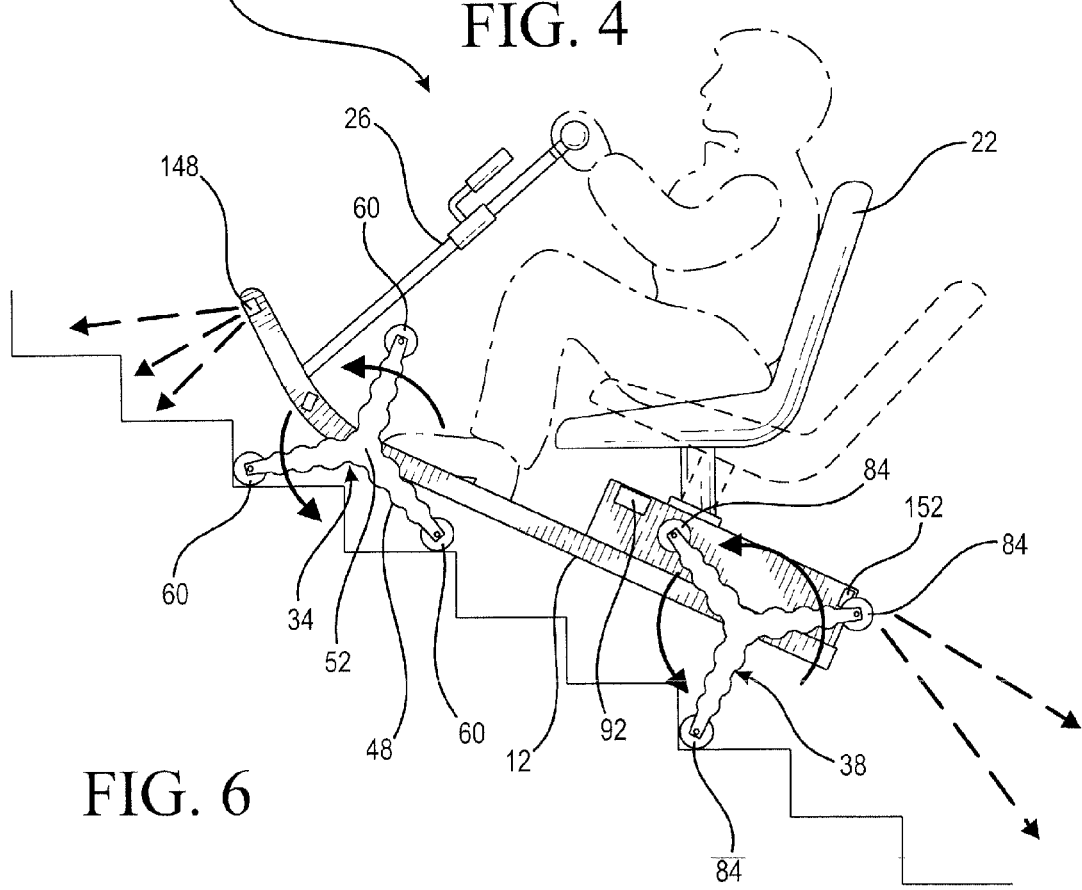
FIG. 6 is a side view showing the mobility vehicle climbing.

Referring to FIG. 6, with the slow rotation rate of the rotating forked assembly units 34, 36, 38, 40 the fork arms 46, 48, 50, 70, 72, 74 rotate in a manner maintaining optimal contact with the ground. For example, with two wheels 60, 84 in contact with stair treads, the fork arms 46, 48, 50, 70, 72, 74 with bumps 54, 78 defining rough surfaces and wheels 60, 84 not rotating will catch the tread and grab to lift the vehicle. The upwardly pointed arm 60, 84 will rotate pass the riser then catch the tread.

Figure 2:
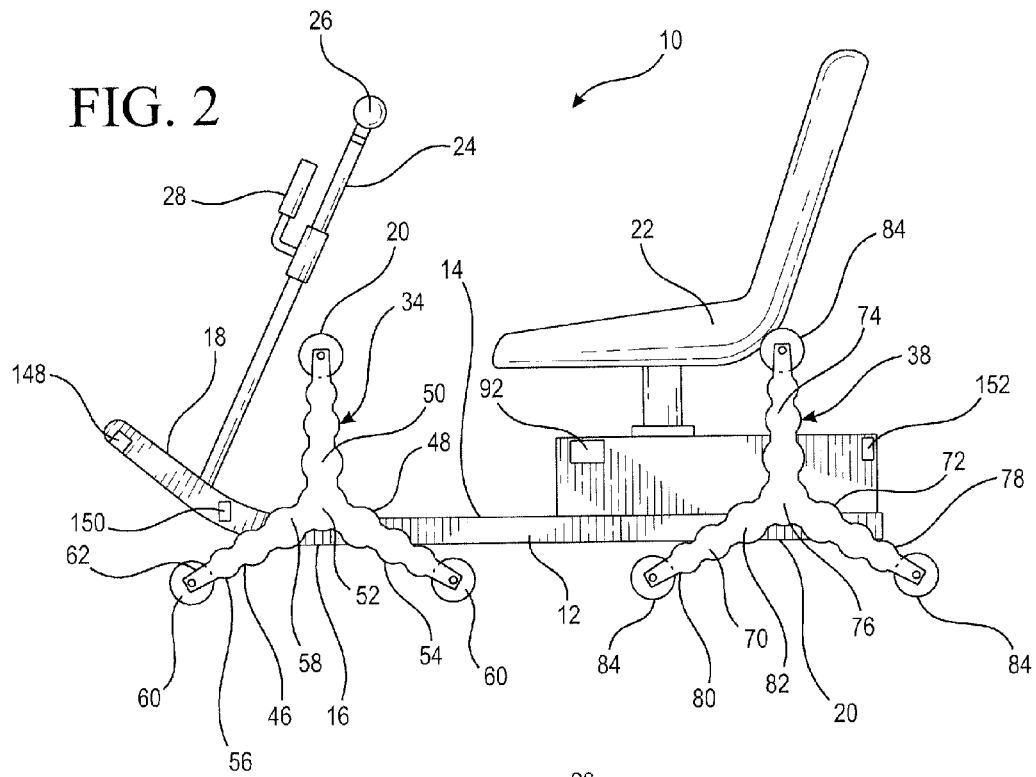
FIGS. 2 and 2A are opposite side views of the present mobility vehicle.
Figure 2A:
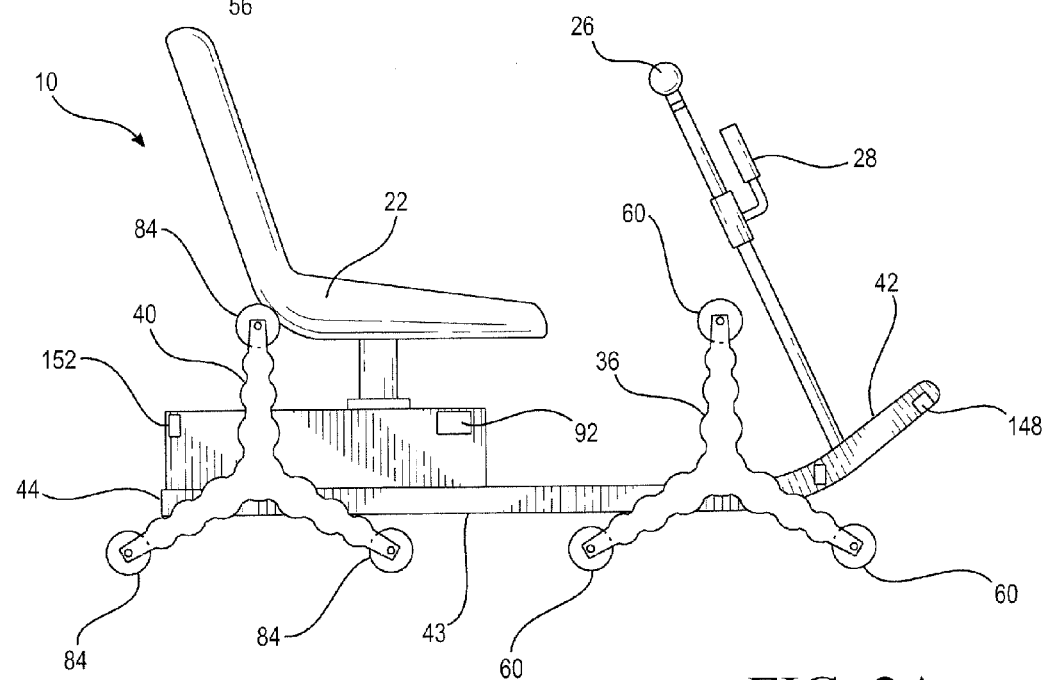
Figure 3:
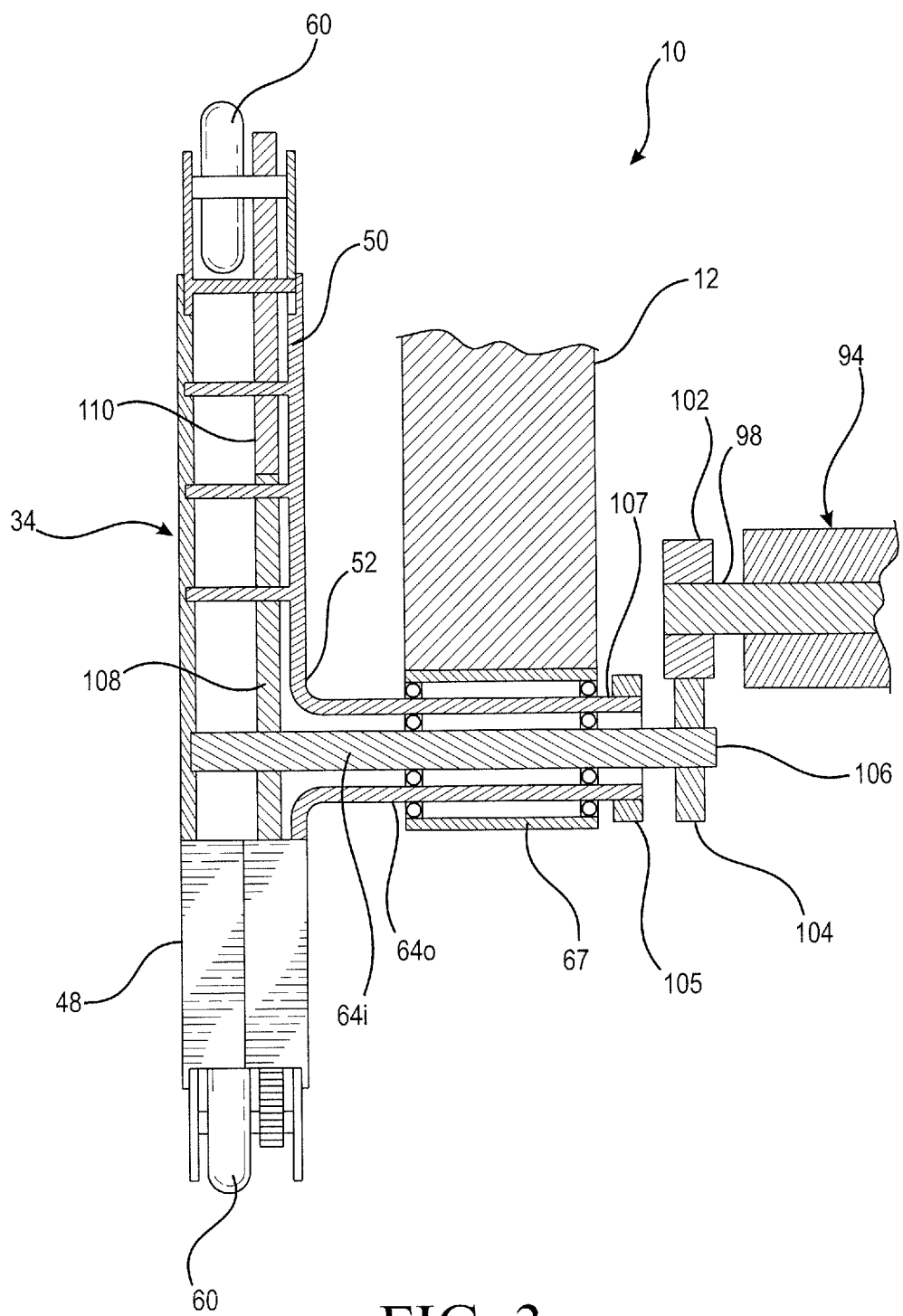
FIG. 3 is a partial cross sectional view of the drive system for the present mobility vehicle.
Figure 4:
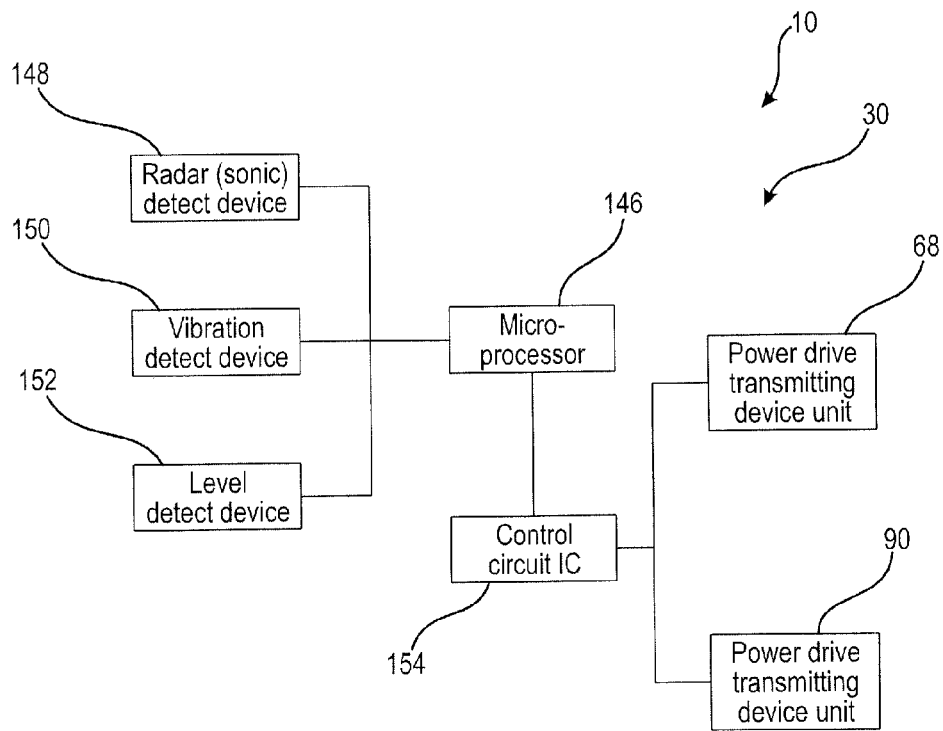
FIG. 4 is a schematic of the operating components of the present mobility vehicle.

As discussed above, the control assembly 30 also includes a level detection device 152 (which in accordance with a preferred embodiment is in the form of a switch). The level detection device 152 assists in the control of the mobility vehicle 10 by allowing the microprocessor 146 to control the actions of the mobility vehicle 10 based upon the level of the mobility vehicle 10. When two fork arms 60, 84 move horizontal to the surface, the level switch is at level (parallel to the surface)—'OFF' position. When radar detection device 148 detects the distance to the obstacle approaching 1-2" the rotating forked assembly units 34, 36, 38, 40 begin rotation to climb steps, and the mobility vehicle will not be level. At this moment the level detection device 152 will be in the 'ON' position (that is, indicating uneven terrain) and it will turn off the radar detection device 148 functions. When the mobility vehicle 10 reaches a flat surface at the top, the level detection device 152 will switch to an 'OFF' position (that is, indicating level terrain) and the radar detection device 148 will turn on to detect other obstacles. If no obstacles are in front, then the microprocessor 146 and the control circuit 154 will signal the front and rear power drive transmitting units 68, 90 to switch to wheel rotation with wheels 60, 84 of two fork arms 46, 48, 50, 70, 72, 74 on the ground as shown in FIGS. 2 and 2A, and with the transmitting gear 102 in engagement with drive gear 104 so as to actuate drive gear 108 and ultimately the wheels 60, 84.

Ultimately, the dual drive system of the present invention employing wheels 60, 84 and forked assembly units 34, 36, 38, 40 allows for movement of the mobility vehicle 10 on variety of terrains. Most importantly, it allows a user moving upon a flat surface (with the simple rotation of the wheels 60, 64) to traverse a curb when such is encountered (with the rotation of the larger diameter forked assembly units 34, 36, 38 40). It is further appreciated that the concepts underlying the present invention may be applied in a manner allowing the mobility vehicle to also climb a series of steps or to facilitate "off road" usage when necessary.

In addition to providing speed controls as discussed above, the steering assembly also includes manual movement controllers for overriding the automatic systems of the control assembly 30 so as to control rotation of the wheels 60, 84, the first and second front rotating forked assembly units 34, 36 and first and second rear rotating forked assembly units 38, 40. The manual movement controllers allow the user to override the automatic control systems described above and manually select whether the wheels 60, 84 should rotate or whether the front and rear fork assembly units 34, 36, 38, 40 should rotate.

Figure 8:
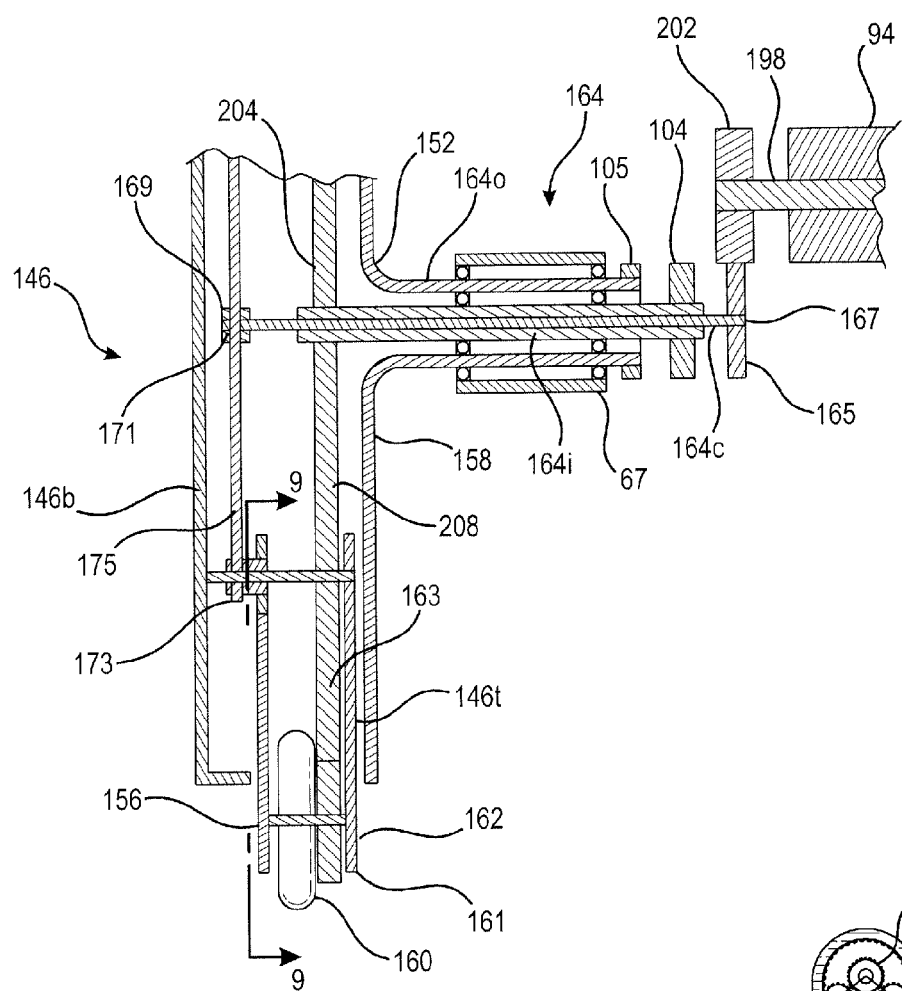
FIG. 8 is cross sectional view showing an alternate embodiment of a drive system for the present mobility vehicle.
Figure 9:
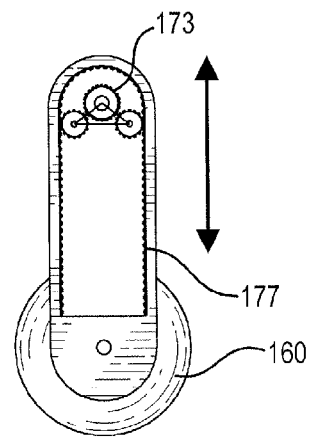
FIG. 9 is a detailed side view along the line 9-9 in FIG. 8.
Figure 10:
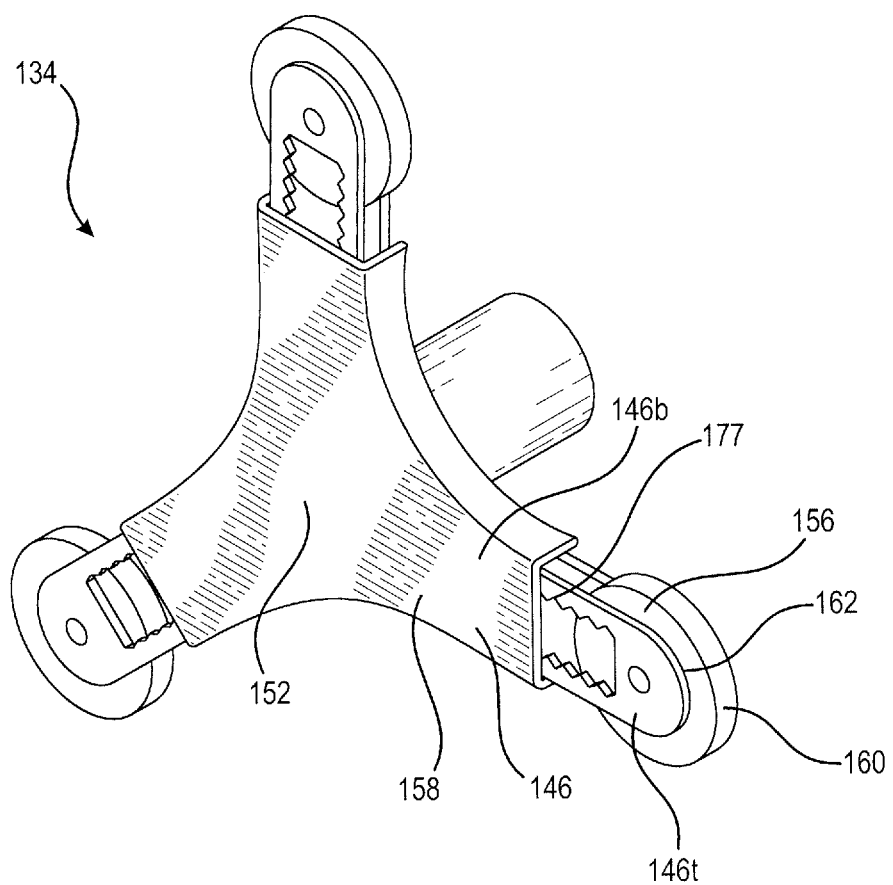
FIG. 10 is a perspective view a forked assembly unit implementing the alternate embodiment of FIGS. 8 and 9.

With reference to FIGS. 8-10, it is further appreciated the mobility device may be constructed with forked assembly units (only forked assembly unit 234 is shown although they are the same) having the ability to extend and retract to suit specific needs. In particular, each of the forked assembly units includes an extension member formed as part of the three fork arms extending therefrom. The extension member allows the overall length of the fork arms to extend and retract as a larger diameter forked assembly unit is required.

The forked assembly units in accordance with this embodiment are substantially identical and the functioning of a single fork arm 246 will be described below although it is appreciated such structure is the same for all forked assembly units and the fork arms extending therefrom.

The fork arm 246 extends outwardly from a central hub 252. The fork arm 246 includes a static base member 246*b* and a telescoping extension member 246*t*. The fork arm 246 includes a first end 258 (which is part of the static base member 246*b*) and a second end 256 (which forms part of the telescoping extension member 246*t*) with a wheel 260 at the tip 262 thereof.

As with the prior embodiment, a drive shaft 264 applies rotational force to the forked assembly unit 234 which allows for the selective rotation of the wheels 260, the entire forked assembly unit 234, as well as the controlled extension of the fork arm 246. In particular, the drive shaft 264 includes concentric inner and outer drive shafts 264*i*, 264*o* which respectively drive the wheels 260 or the forked assembly unit 234 as described above with regard to the prior embodiment.

However, and with reference to this embodiment, the drive shaft 264 also includes a central drive shaft 264*c* which functions to drive the mechanism controlling extension and retraction of the fork arm 246. The central drive shaft 264*c* includes a drive gear 265 at the first end 267 thereof which is selectively engaged with the transmitting gear 202 of the first output 298. The second end 269 of the central drive shaft 264*c* includes a drive gear 271 linked to an inner gear 273 of the fork arm 246 via a belt drive 275. The inner gear 273, when rotated under the control of the central drive shaft 264*c*, acts upon teeth along the inner recess 277 of the telescoping extending member 246*b* to cause the telescoping extension member 246*t* to extend or retract relative to the static base member 246*b*. It is appreciated the belt drive 275 is of a serpentine construction and as such acts upon all of the fork arms of the forked assembly unit 234 at the same time to cause extension or retraction thereof.

It is appreciated the extension of the fork arm 246 alters the gearing arrangement for the rotation of the wheels 260 since the wheels 260 sit on the end of the telescoping extension member 246*t* at the second end 256 of the fork arm 246. Since it is not necessary for the wheels 260 to rotate when the form arm 246 is extended, the wheels 260 are provided with an engagement gear 261 that couples the wheels 260 with a drive gear 263 at the static base member 246*b* when the fork arm 246 is in its retracted orientation. The drive gear 263 is linked to the belt drive gear 208 and the drive gear 204 at the first end of the inner drive shaft 264*i*.

It is appreciated the control assembly of the present mobility vehicle can be integrated with a smart phone/iPad, Google glasses, etc. It is also appreciated the control assembly may be controlled by voice, eyeball movement, hand/finger gesture, or combination thereof.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. An electric powered mobility vehicle, comprising:
   a main support having an upper surface and a lower surface, wherein the main support also includes a front end and a rear end;
   a seat assembly secured to the upper surface of the main support adjacent the rear end;
   a steering assembly extends upwardly from the upper surface of the main support along the front end thereof;
   a control assembly and a power drive transmission assembly linked to a plurality of rotating forked assembly units secured to the main support for creating the forces necessary to move and maneuver the present mobility vehicle, each of the plurality of rotating forked assembly units includes a plurality of fork arms extending outwardly from a central hub and wheels coupled to free ends of the plurality of fork arms, and each of the plurality of rotating forked assembly units includes concentric drive shafts acting upon the plurality of fork arms and the wheels to selectively allow for the application of power to either the wheels or the rotating forked assembly unit, one of the drive shafts being mechanically coupled to the wheels for rotation thereof upon the application of rotational motion to the one of the drive shafts by the power drive transmission assembly and another of the drive shafts being mechanically coupled to the rotating forked assembly unit for rotation of the forked assembly unit upon the application of rotational motion to the another of the drive shafts by the power drive transmission assembly.

2. The mobility device according to claim 1, wherein the rear end of the main support is substantially flat and the front end of the main support is curved upwardly.

3. The mobility device according to claim 1, wherein the plurality of rotating forked assembly units includes first and second front rotating forked assembly units secured to the main support at a position adjacent the front end of the main support and first and second rear rotating forked assembly units secured to the main support at a position adjacent the rear end of the main support.

4. An electric powered mobility vehicle, comprising:
   a main support having an upper surface and a lower surface, wherein the main support also includes a front end and a rear end;
   a seat assembly secured to the upper surface of the main support adjacent the rear end;
   a steering assembly extends upwardly from the upper surface of the main support along the front end thereof;
   a control assembly and a power drive transmission assembly linked to a plurality of rotating forked assembly units secured to the main support for creating the forces necessary to move and maneuver the present mobility vehicle, each of the plurality of rotating forked assembly units includes a plurality of fork arms extending outwardly from a central hub and wheels coupled to free ends of the plurality of fork arms, and each of the plurality of rotating forked assembly units includes concentric drive shafts acting upon the plurality of fork arms and the wheels to control rotation thereof;
   wherein the plurality of rotating forked assembly units includes first and second front rotating forked assembly units secured to the main support at a position adjacent the front end of the main support and first and second rear rotating forked assembly units secured to the main support at a position adjacent the rear end of the main support; and
   wherein the power drive transmission assembly includes a front power drive transmitting unit controlling rotation of the first and second front rotating forked assembly units and a rear power drive transmitting unit controlling rotation of the first and second rear rotating forked assembly units.

5. The mobility device according to claim 4, wherein the concentric drive shafts of each of the front power drive transmitting unit and the rear power drive transmitting unit includes concentric inner and outer drive shafts selectively controlling rotation of the wheels and the forked assembly units.

6. The mobility device according to claim 5, wherein transmission of power to the inner drive shaft causes rotation of the wheels and transmission of power to the outer drive shaft causes rotation of the rotating forked assembly units.

7. The mobility device according to claim 6, wherein the outer drive shaft is fixedly coupled to the rotating forked assembly units.

8. The mobility device according to claim 4, wherein the rear power drive transmitting unit includes first and second electric motors and the rear power drive transmitting unit includes first and second electric motors.

9. The mobility device according to claim 8, wherein each of the plurality of rotating forked assembly units includes three fork arms extending outwardly from the central hub.

10. The mobility device according to claim 9, wherein the three forks arms are symmetrically positioned and respectively define 120 degree angles between adjacent fork arms.

11. The mobility device according to claim 8, wherein the control assembly includes a microprocessor receiving sensor signals.

12. The mobility device according to claim 11 wherein the sensor signals are received from a radar detection device, a vibration detection device and a level detection device.

13. The mobility device according to claim 1, wherein each of the plurality of rotating forked assembly units includes three fork arms extending outwardly from the central hub.

14. The mobility device according to claim 13, wherein the three forks arms are symmetrically positioned and respectively define 120 degree angles between adjacent fork arms.

15. The mobility device according to claim 1, wherein the control assembly includes a microprocessor receiving sensor signals.

16. An electric powered mobility vehicle, comprising:
   a main support having an upper surface and a lower surface, wherein the main support also includes a front end and a rear end;
   a seat assembly secured to the upper surface of the main support adjacent the rear end;
   a steering assembly extends upwardly from the upper surface of the main support along the front end thereof;
   a control assembly and a power drive transmission assembly linked to a plurality of rotating forked assembly units secured to the main support for creating the forces necessary to move and maneuver the present mobility vehicle, each of the plurality of rotating forked assembly units includes a plurality of fork arms extending outwardly from a central hub and wheels coupled to free ends of the plurality of fork arms, and each of the plurality of rotating forked assembly units includes concentric drive shafts acting upon the plurality of fork arms and the wheels to control rotation thereof;

wherein the control assembly includes a microprocessor receiving sensor signals; and wherein the sensor signals are received from a radar detection device, a vibration detection device and a level detection device.

* * * * *